United States Patent
Ruiters

(10) Patent No.: US 9,836,901 B2
(45) Date of Patent: Dec. 5, 2017

(54) METHOD OF MANAGING STUDENT ARRIVAL AND STUDENT DISMISSAL

(71) Applicant: Mark H. Ruiters, Gaithersburg, MD (US)

(72) Inventor: Mark H. Ruiters, Gaithersburg, MD (US)

(*) Notice: Subject to any disclaimer, the term of this patent is extended or adjusted under 35 U.S.C. 154(b) by 0 days.

(21) Appl. No.: 15/250,683

(22) Filed: Aug. 29, 2016

(65) Prior Publication Data

US 2017/0061719 A1    Mar. 2, 2017

Related U.S. Application Data

(60) Provisional application No. 62/210,662, filed on Aug. 27, 2015.

(51) Int. Cl.

| | |
|---|---|
| *G05B 19/00* | (2006.01) |
| *G05B 23/00* | (2006.01) |
| *G07C 9/00* | (2006.01) |
| *H04W 76/02* | (2009.01) |
| *G06F 17/30* | (2006.01) |
| *H04L 29/06* | (2006.01) |
| *G01C 21/36* | (2006.01) |
| *H04W 12/06* | (2009.01) |
| *H04W 12/08* | (2009.01) |

(52) U.S. Cl.
CPC ......... *G07C 9/00158* (2013.01); *G01C 21/36* (2013.01); *G06F 17/30247* (2013.01); *H04L 63/102* (2013.01); *H04W 12/06* (2013.01); *H04W 76/02* (2013.01); *H04L 63/0861* (2013.01); *H04W 12/08* (2013.01)

(58) Field of Classification Search
CPC .................................................. G07C 9/00158
USPC .......................................................... 340/5.53
See application file for complete search history.

(56) References Cited

U.S. PATENT DOCUMENTS

| | | | |
|---|---|---|---|
| 2005/0021205 A1* | 1/2005 | Niwa | B60G 17/016 701/37 |
| 2013/0113936 A1* | 5/2013 | Cohen | G07B 15/02 348/148 |
| 2014/0266800 A1* | 9/2014 | Koukoumidis | G08G 1/141 340/932.2 |
| 2015/0057926 A1* | 2/2015 | Gupta | G01C 21/165 701/500 |
| 2015/0142309 A1* | 5/2015 | Sun | G01C 21/165 701/469 |
| 2015/0169968 A1* | 6/2015 | Michmerhuizen | G06K 9/00805 348/148 |

(Continued)

*Primary Examiner* — Santiago Garcia

(57) ABSTRACT

A method of managing student arrival and student dismissal is executed within a remote server as the remote server is communicably coupled with at least one automobile identification (AI) device. The AI device scans an incoming vehicle in order to identify at least one authorized profile. The authorized profile is assigned to a student profile and recognize as one of the driver profiles within the remote server. Upon validation of the authorized profile, the remote server generates an updated instruction that includes at least one student management instruction and at least one additional instruction that are accessed and defined by parent profiles or faculty profiles. Then the updated instruction is sent from the remote server to a selected computing device so that the student arrival and student dismissal can be processed.

19 Claims, 10 Drawing Sheets

(56) References Cited

U.S. PATENT DOCUMENTS

| | | | |
|---|---|---|---|
| 2015/0279130 A1* | 10/2015 | Robertson | G07C 9/00571 340/5.61 |
| 2017/0024945 A1* | 1/2017 | Shalev | G07C 9/00103 |
| 2017/0061508 A1* | 3/2017 | Sen | G06Q 30/0284 |
| 2017/0116790 A1* | 4/2017 | Kusens | G07B 15/02 |

* cited by examiner

METHOD OF MANAGING STUDENT ARRIVAL AND STUDENT DISMISSAL

The current application claims a priority to the U.S. Provisional Patent application Ser. No. 62/210,662 filed on Aug. 27, 2015. The current application is filed on Aug. 29, 2016 while Aug. 27, 2016 was on a weekend.

FIELD OF THE INVENTION

The present invention relates generally to student dismissal. In particular, the present invention is a software system that manages the arrival and dismissal of students, with various means of vehicle recognition and change management.

BACKGROUND OF THE INVENTION

Schools throughout the world need to handle countless numbers of students arriving and being dismissed each day. With this, there are constant changes occurring with the arrival and dismissal of students, shown in the form of parent notes, emails, voicemails, and more. Due to such a large quantity, many of these updates are often lost, causing confusion as certain parties are not informed of the changes. With or without changes, afternoon dismissal is often chaotic and noisy, increasing the already long parental wait times and delayed bus departures.

To alleviate some of these issues, inventors have developed software systems that manages the dismissal of students. One such example is US patent application US20130162397A1, which assigns unique identifier tags to vehicles that are detected upon arriving at a school. When detected, electronic messages are sent to classrooms, notifying students that they are ready to be picked up. Another such invention is, "CarRiderPro," which works similarly to US20130162397A1. The problem with systems like these is that they lack flexibility, are not suited to handle complex changes relating to carpool, bus, and afterschool activity changes, and are limited in their means of vehicle ecognition.

It is therefore an objective of the present invention to introduce a new student dismissal system, more commonly known as, "School-Pass." The present invention is a software system that manages the arrival and dismissal of students. Student safety and campus security will increase, while automated techniques will reduce the dismissal time for students and drivers (parents, bus drivers, etc.). Authorized drivers are assigned a unique automated identification numbers (Unique IDs), which could be a carpool number signs, toll tag number, license plate number, or RFID tag integrated into any of the aforementioned ID tags. A carpool record in a database can have multiple drivers and multiple families attached. Students are then attached to the carpool record via a carpool schedule, which can be managed by parents or school staff, by day, driver, student, and more.

When the unique ID is detected, notifications are sent to the classroom or dismissal location or staff members alerting them of the driver's arrival. The student will be scheduled in the classroom or dismissal location with instructions of where to go and how long it should take to get to the pickup area. Additionally, gates may be programmed to automatically open, security alerts may be dispersed and more. The system incorporates the use of an arrival/dismissal change management module, which may be used online and on remote smart devices. This module can be used to record arrival and dismissal changes by parents and staff. These changes are merged into the dismissal instruction when the driver is verified. Students not leaving with carpool or bus drivers are managed in an after-school activity module, allowing parents and staff to enroll students into these activities. Overall, the present invention is safe and effective, as it reduces parent wait time by up to 65%, reduces total dismissal time by about 50%, reduces administrative time by thousands of hours, improves bus departure times by 60%, reduces traffic congestion, and includes easy 3-5 day implementation. The present invention offers real-time parent ETA notifications, assists with on-time bus departures, and reduces traffic impact. Unlike other systems, the present invention is unique as it handles complex carpool schedules and incorporates the use of toll tags and license plates for the purpose of driver/vehicle identification.

DETAIL DESCRIPTIONS OF THE INVENTION

All illustrations of the drawings are for the purpose of describing selected versions of the present invention and are not intended to limit the scope of the present invention.

Figure 1:
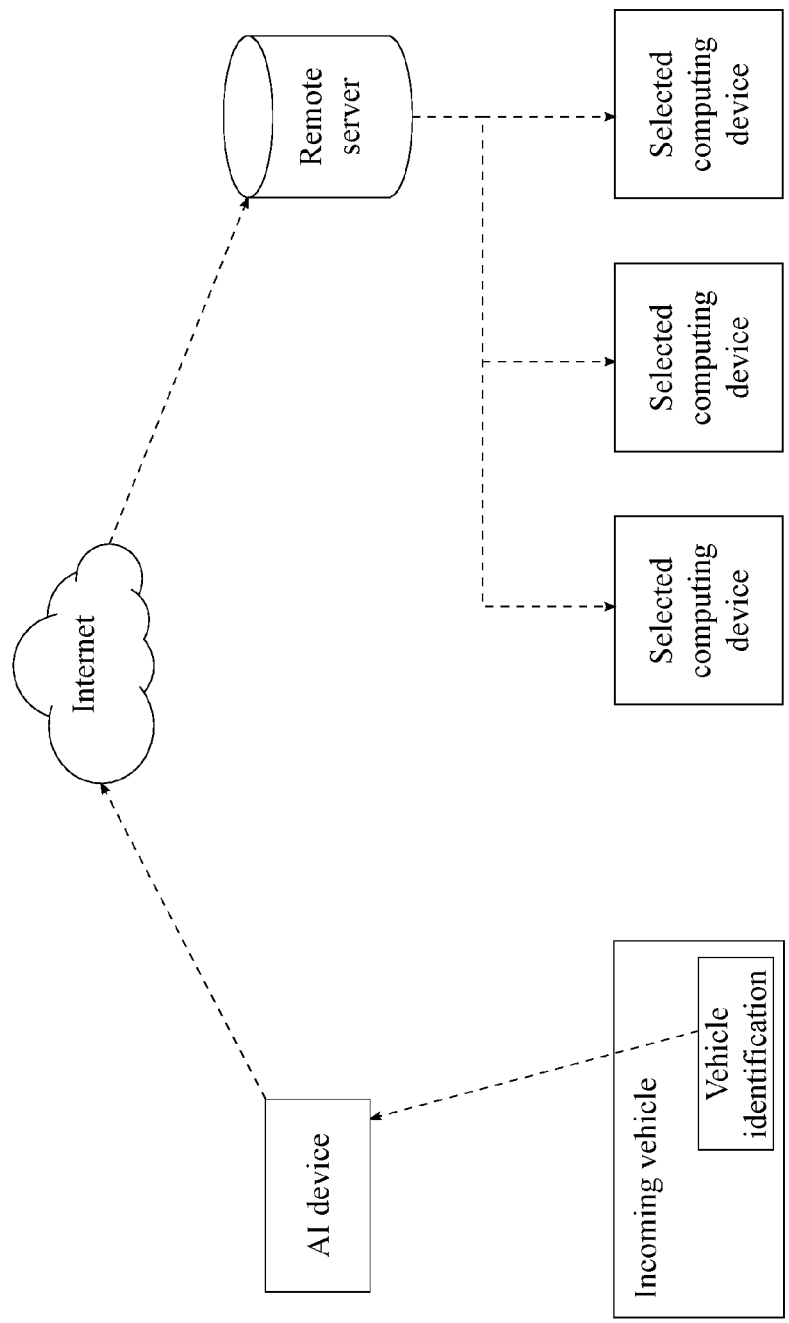
FIG. 1 is a network diagram illustrating the hardware components and connections which the present invention is executed.

The present invention is a student arrival and dismissal system to increase student safety and campus security while an automated result of the present invention reduces the dismissal time between students and drivers. Before explaining the preferred embodiment of the present invention in detail, it is to be understood that corresponding devices are not limited in their application to the details of the components and arrangements as described or illustrated. The present invention is capable of other embodiments and of being utilized and carried out in various ways. It is also to be understood that the phrasing and terminology employed herein are for the purpose of description and should not be regarded as limiting such that the present invention is primarily used on school campuses, but the present invention may be applied to many other settings, situations, and scenarios. In order for the present invention to be executed, at least one automobile identifying (AI) device that is located at a school facility entrance needs to be communicably coupled with a remote server as shown in FIG. 1. The system platform of the present invention is executed on the remote server as the system platform includes a plurality of student supervision features, a plurality of driver profiles, a plurality of faculty profiles, and a plurality of parent profiles that are stored within the remote server.

To engage with the system platform, parents, faculty members, and drivers can access a mobile site which runs on the remote server through utilization of a mobile application program interface (mobile API) on a remote mobile device, such as a smartphone, tablet, smart watch, etc. As well, to engage with the system platform, parents, faculty members, and drivers can access a .Net application which runs on the remote server. In reference to FIG. 2-3, after inputting their own user identification and password, parents registered with the system platform may log in as the parent profiles to access the student supervision features through the mobile application or .Net application with a computer device or similar device. Similarly, after inputting their own user identification and password, drivers registered with the system platform can log in as the driver profiles to access the student supervision features and faculty member registered with the system platform can log in as the faculty profiles to access the student supervision features. Additionally, each of the driver profiles within the present invention can be a parent-driver profile, a bus-driver profile, a student-driver profile, a guest-driver profile, and a faculty-driver profile.

Figure 2:
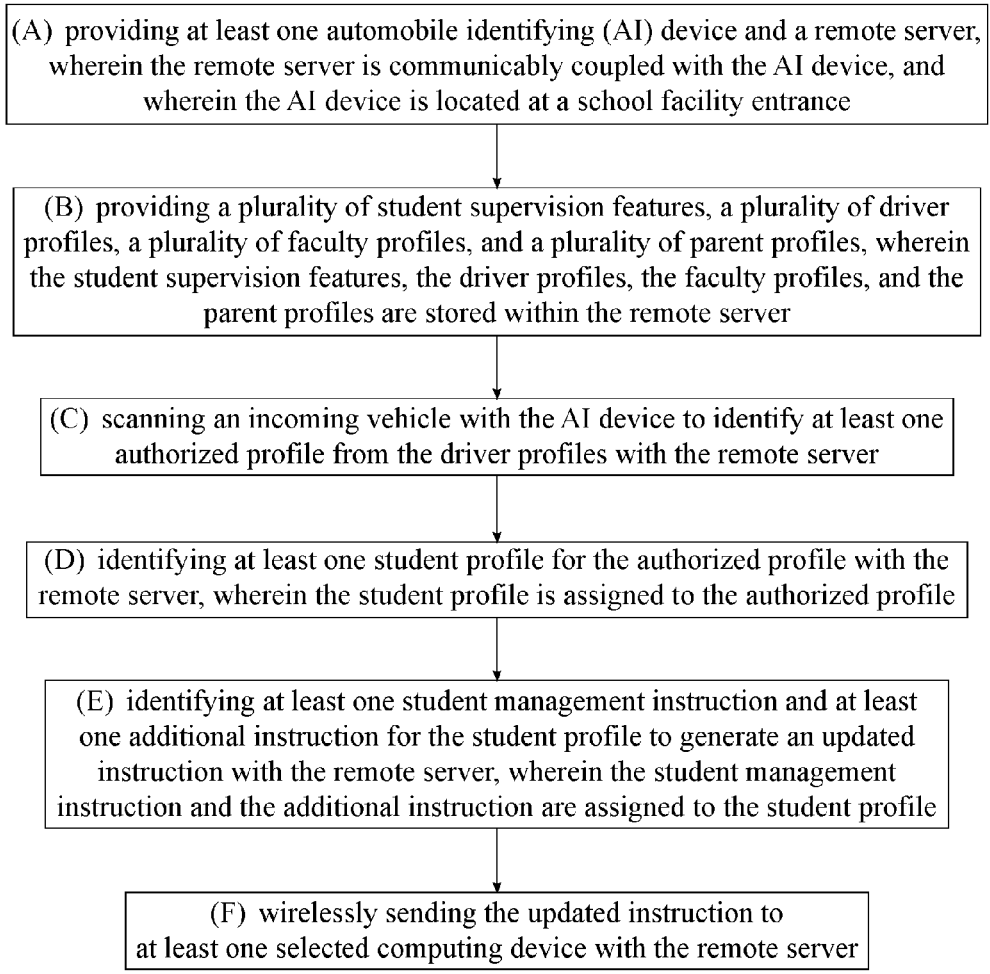
FIG. 2 is a basic flow chart illustrating the overall process of the present invention.
Figure 3:
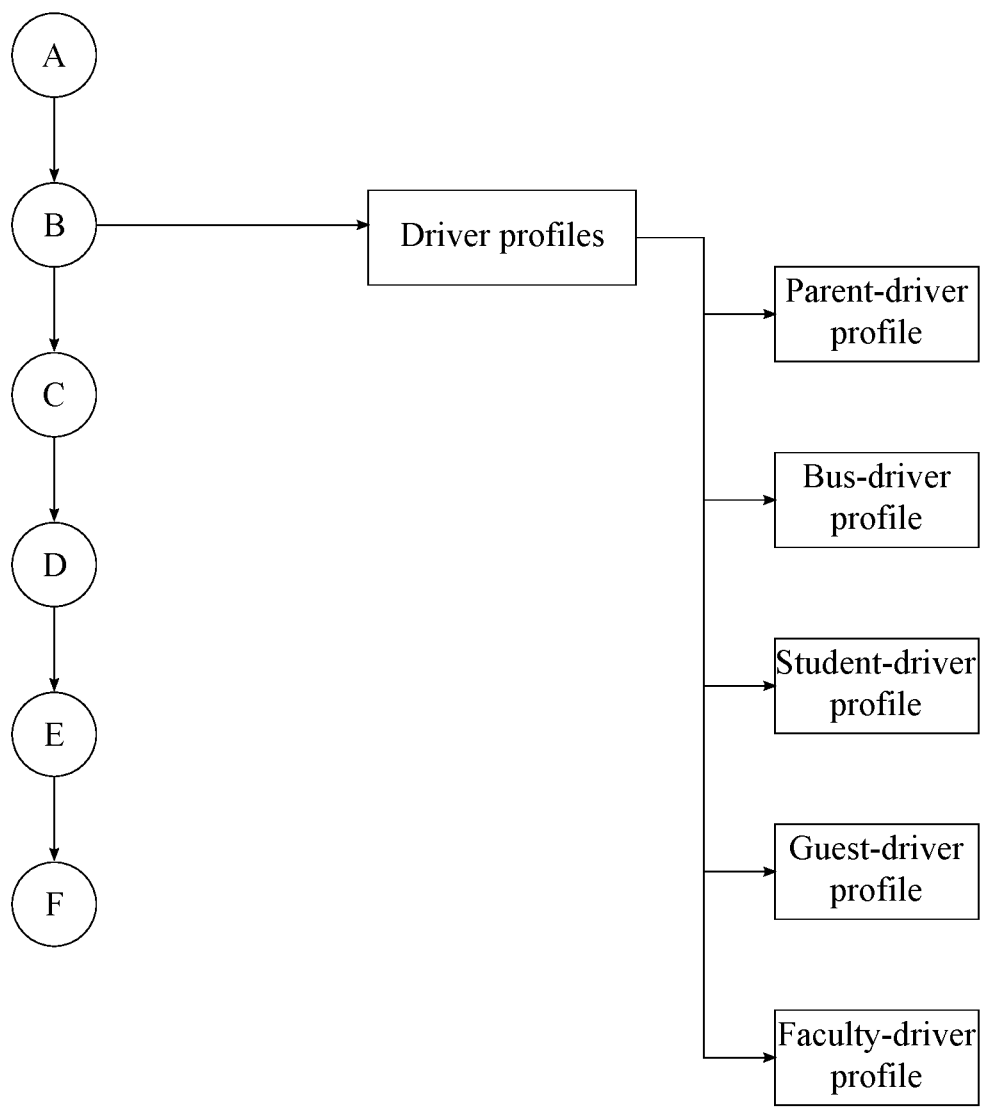
FIG. 3 is a basic flow chart illustrating different driver profiles with the present invention.
Figure 4:
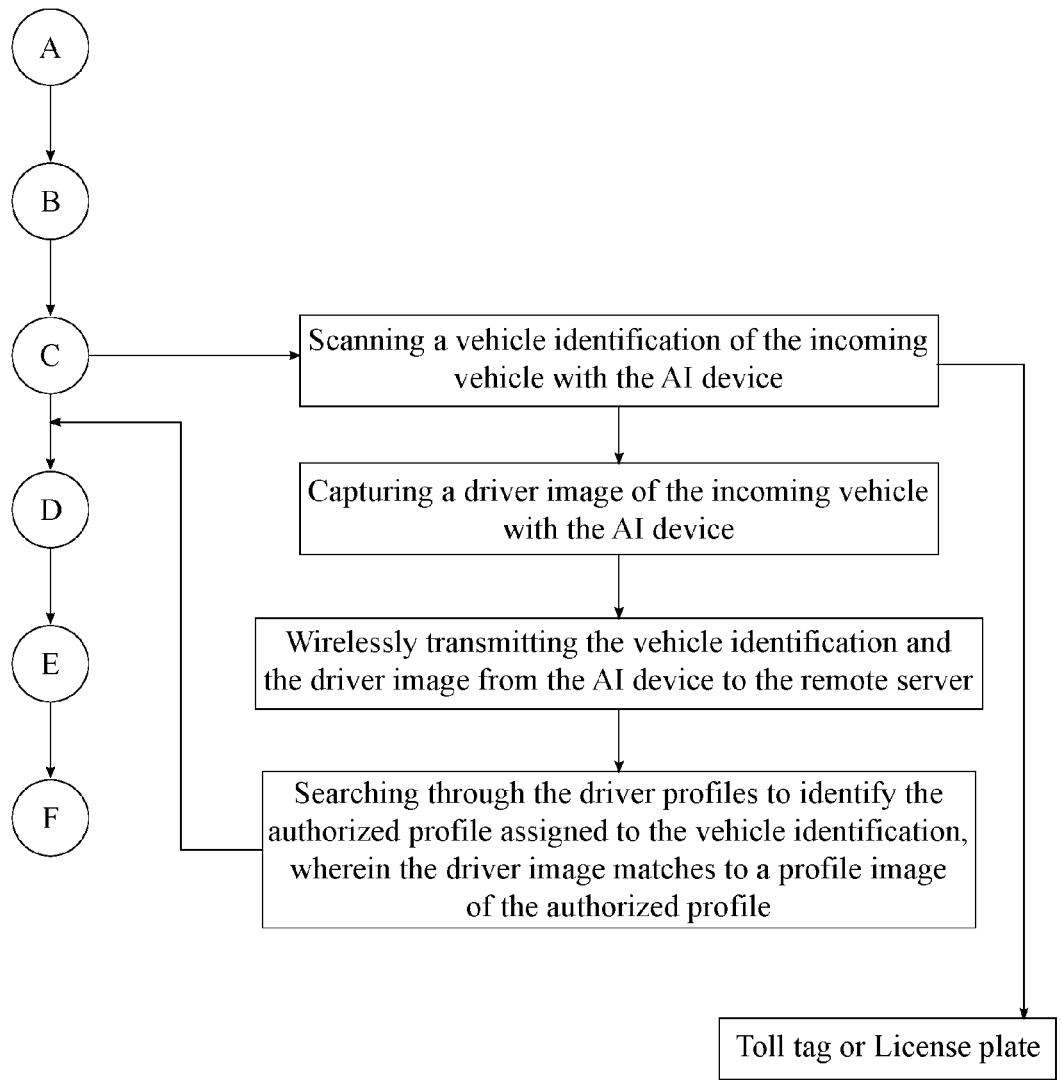
FIG. 4 is a basic flow chart illustrating the method of vehicle scanning to identify the authorized profile with the overall process of the present invention.
Figure 5:
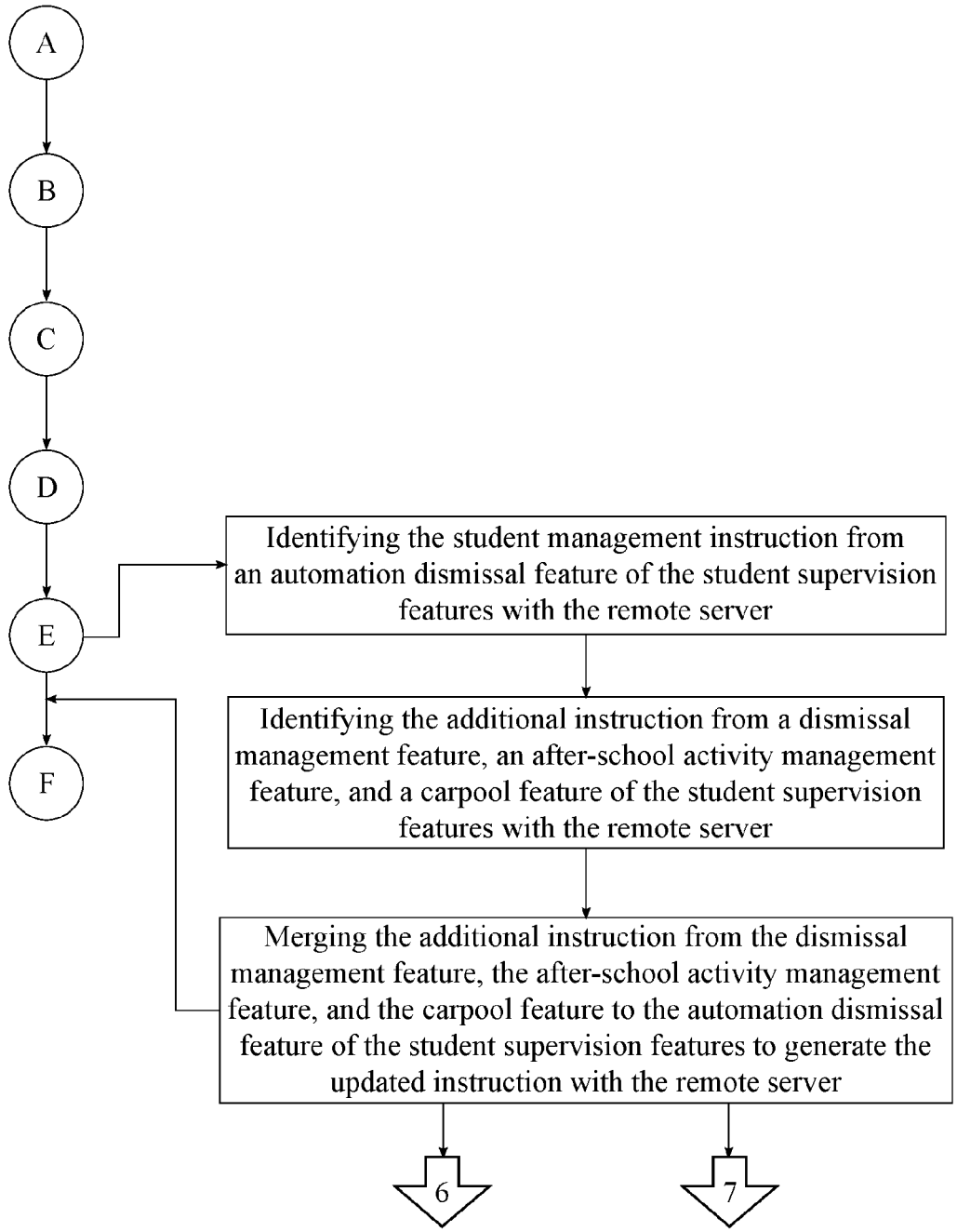
FIG. 5 is a basic flow chart illustrating the method of generating the updated instruction within the overall process of the present invention.
Figure 6:
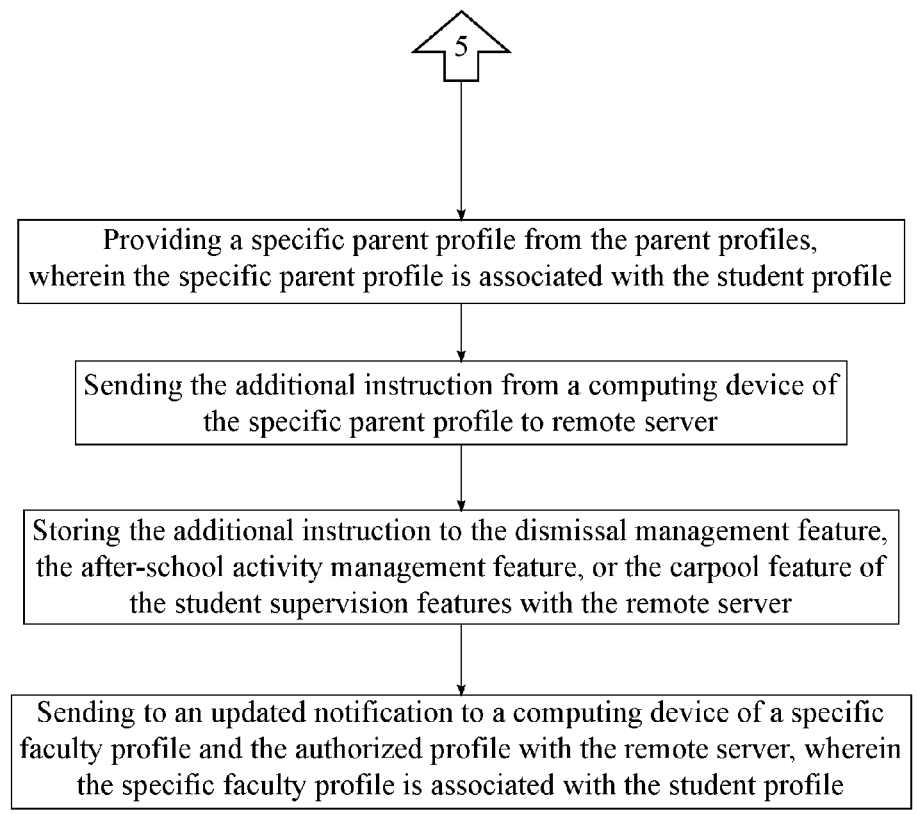
FIG. 6 is a basic flow chart illustrating the method of inputting the additional instruction by the specific parent profile within the overall process of the present invention.
Figure 7:
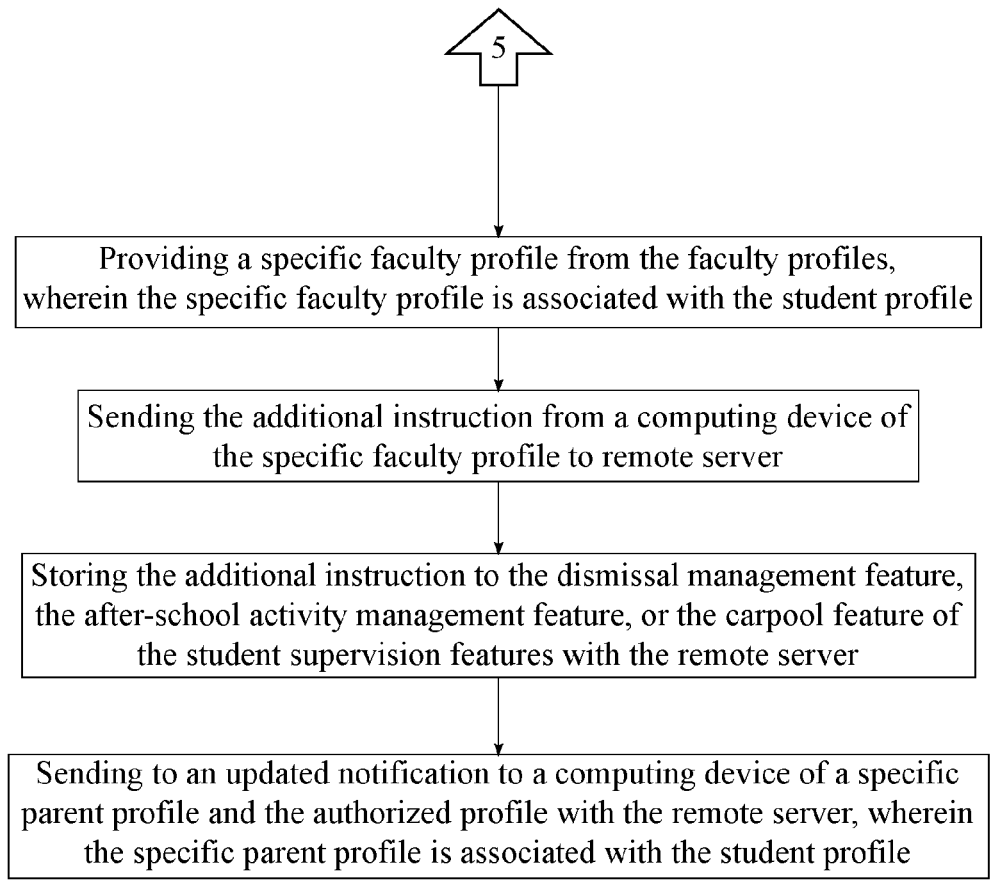
FIG. 7 is a basic flow chart illustrating the method of inputting the additional instruction by the specific faculty profile within the overall process of the present invention.

In the preferred embodiment of the present invention as shown in FIG. 2 and FIG. 4, when the school facility entrance has an incoming vehicle, the AI device scans the incoming vehicle so that the remote server is able to identify at least one authorized profile from the driver profile. More specifically, the AI device scans for a vehicle identification of the incoming vehicle, wherein the vehicle identification can be a separate remote device that is removable from the incoming vehicle or an integrated Radio-frequency identification (RFID) tag, such as their license plate, carpool sign, or toll tag. Additionally, the vehicle identification can be a visual tag that includes, but is not limited to, license plates, carpool signs, and similar devices. In order to properly scan the vehicle identification, the AI device is located generally by the pickup line(s) and/or the drop-off line(s). The AI device also captures a driver image of the incoming vehicle so that the vehicle identification and the driver image can be wirelessly transmitted to the remote server. In a preferred embodiment of the AI device comprises a receiver and a transmitter. The receiver comprises a video camera to capture the driver image and a RFID tag reader to scan or visually capture the vehicle identification. The transmitter is then able to transmit the driver image and the vehicle identification to the remote server. Once the driver image and the vehicle identification are transmitted to the remote server, the present invention searches through the driver profiles to identify the authorized profile assigned to the vehicle identification, wherein the driver images matches to a profile image of the authorized profile.

The remote server then identifies at least one student profile for the authorized profile as the student profile is assigned to the authorized profile. Depending upon different circumstances, the student profile can be assigned by either a specific parent profile from the parent profiles that is associated with the student profile or a specific faculty profile from the faculty profiles that is associated with the student profile through an automation dismissal feature of the student supervision features. For example, the student profile can be scheduled to a particular school bus by the specific faculty profile. Similarly, the student profile can be scheduled to a carpool by the specific parent profile.

In reference to FIG. 2 and FIG. 5-7, the remote server then identifies at least one student management instruction and at least one additional instruction for the student profile in order to generate an updated instruction as the student management instruction and the additional instruction are assigned to the student profile by the specific parent profile and the specific faculty profile. More specifically, the remote server identifies the student management instruction from the automation dismissal features. The remote server then identifies the additional instruction from a dismissal management feature, an after-school activity management feature, and a carpool feature of the student supervision feature. Depending upon different circumstances, the dismissal management feature, the after-school activity management feature, and the carpool feature are accessed by the specific faculty profile or the specific parent profile. The remote server then merges the additional instruction from the dismissal management feature, the after-school activity management feature, and the carpool feature to the automation dismissal feature of the student supervision features to generate the updated instruction.

When the specific parent profile sends the additional instruction to the remote server with a computing device, the additional instruction is stored within the dismissal management feature, the after-school activity management feature, or the carpool feature depending upon specifications of the additional instruction. As a result, the specific parent profile can update or modify the arrival and dismissal calendar in order to switch carpool schedules, switch authorized profiles, schedule an early pickup, schedule a late arrival, and more. For example, when the student profile is scheduled to a particular school bus, the specific parent profile can remove the student profile from the particular school bus and re-assigned to a carpool or a different parent profile from the parent profiles. To prevent confusion among the faculty members and the associated drivers, the present invention sends an updated notification to a computing device of the specific faculty profile and the authorized profile. In other words, the updated notification provides an annotated explanation about any changes that took place in relation to the student profile. Similarly, when the student profile is scheduled to a particular school bus, the specific faculty profile can remove the student profile form the particular school bus and re-assigned to a different school bus. The present invention then sends the updated notification to a computing device of the specific parent profile and the authorized profile.

Figure 8:
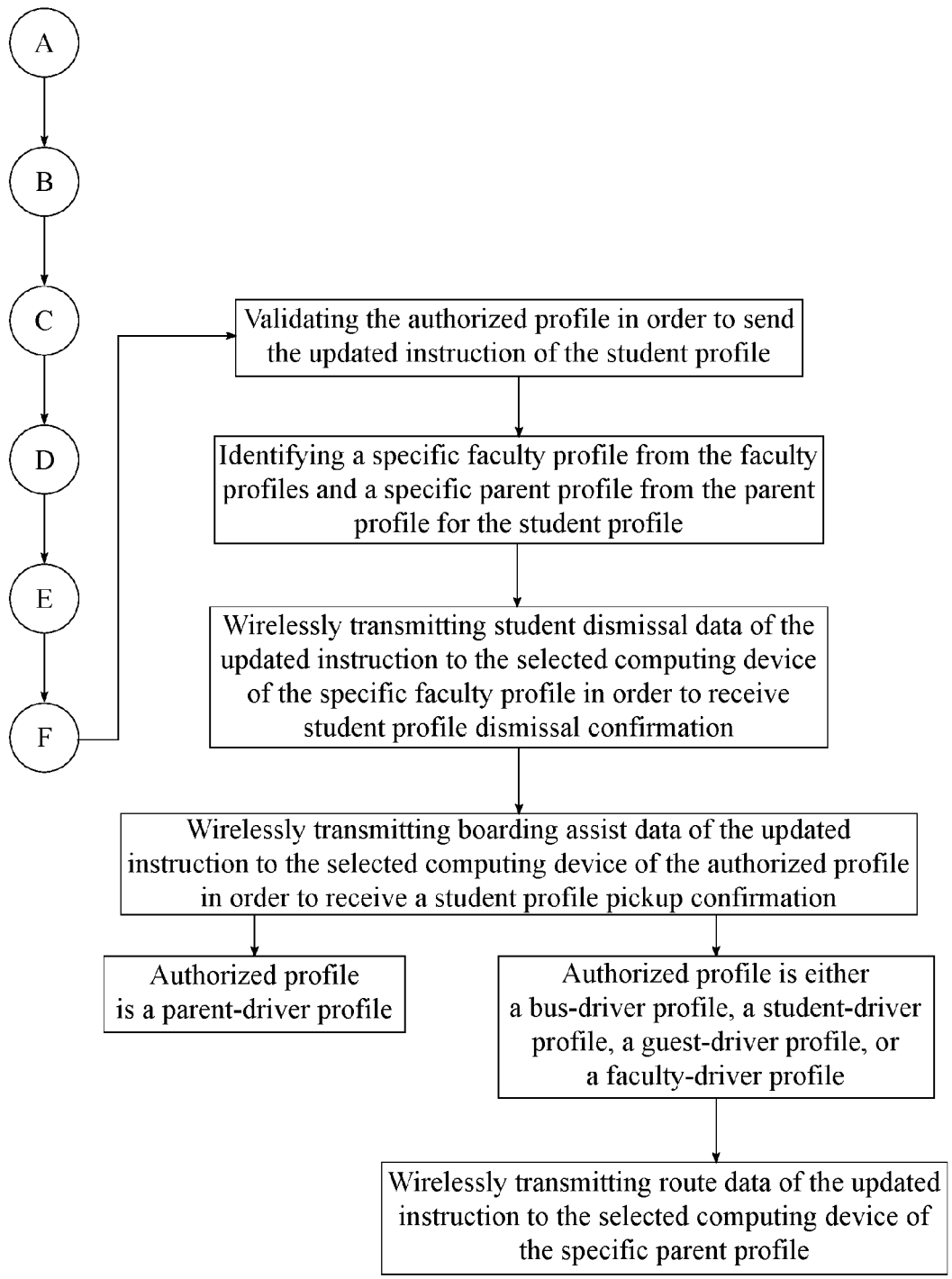
FIG. 8 is a basic flow chart illustrating the method of sending the updated instruction in relation to student dismissal data within the overall process of the present invention.
Figure 9:
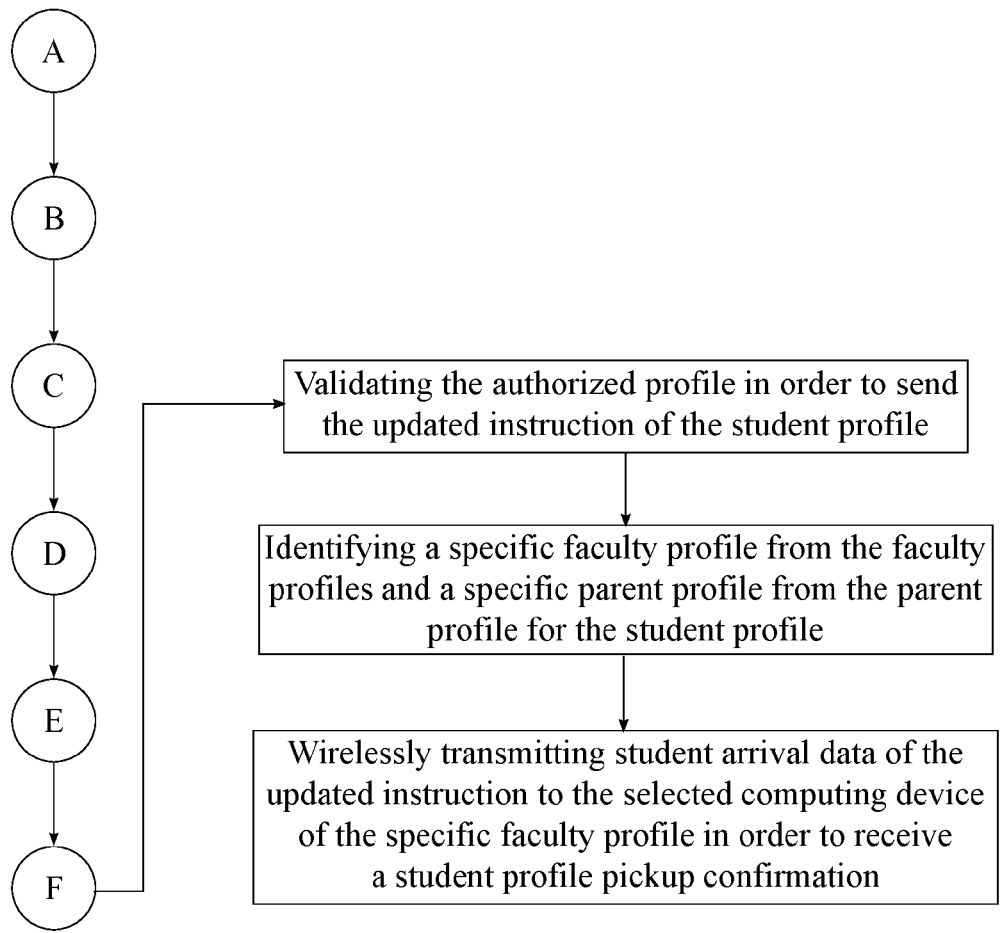
FIG. 9 is a basic flow chart illustrating the method of sending the updated instruction in relation to student arrival data within the overall process of the present invention.

In reference to FIG. 2 and FIG. 8-9, once the updated instruction is generated with the remote server, the updated instruction is wirelessly sent to at least one selected computing device with the remote server. Depending upon the parent profiles, the driver profiles, and the faculty profiles that are involved with the student profile, the remote server decides which is the at least one selected computing device that should receive the updated instruction. More specifically, the remote server validates the authorized profile so that the updated instruction of the student profile can be sent to the specific faculty profile and the specific parent profile.

In reference to student arrival that is shown in FIG. 2 and FIG. 9, the remote server wirelessly transmits student arrival data of the updated instruction to the selected computing device of the specific faculty profile in order to receive a student profile arrival confirmation. The arrival data include the authorized profile, the vehicle identification, the student profile, drop off area, and arrival time. When the specific faculty profile has multiple student picks up, respective authorized profiles are displayed in a list format indicating the position of each authorized profile. More specifically, the list may comprise a plurality of rows, with each row being associated with one of the authorized drivers. The top row of the list is associated with the authorized driver at the front of the arrival line, with each subsequent row being associated with the subsequent authorized driver in arrival line. Each row comprises a plurality of columns that displays the arrival data of the respective authorized driver. Optionally, the remote server also wirelessly transmits a student arrival notification of the updated instruction to the selected computing device of the specific parent profile if the authorized profile is not the parent-driver profile. As a result, when the authorized profile is either the bus-driver profile, the student-driver profile, the guest-driver profile, or the faculty-driver profile, the specific parent profile gets the student arrival notification to the selected computing device indicating that the student has been dropped off at the school. Once the specific faculty profile confirms the arrival of the student profile through the selected computing device, the remote server receives the student profile arrival confirmation from the selected computing device of the authorized profile. As a result, the present invention is able to complete the arrival process of the student profile. Optionally, the authorized profile may also have to input an electronic signature and an electronic timestamp confirming the arrival process of the student profile.

In reference to student dismissal that is shown in FIG. 2 and FIG. 8, the remote server then wirelessly transmits student dismissal data of the updated instruction to the selected computing device of the specific faculty profile in order to receive a student profile dismissal confirmation. The dismissal data include the authorized profile, the vehicle identification, the students profile, pickup area, and pick up time. When the specific faculty profile has multiple student picks ups, respective authorized profiles are displayed in a list format indicating the position of each authorized profile. More specifically, the list may comprise a plurality of rows, with each row being associated with one of the authorized drivers. The top row of the list is associated with the authorized driver at the front of the pickup line, with each subsequent row being associated with the subsequent authorized driver in pickup line. Each row comprises a plurality of columns that displays the dismissal data of the respective authorized driver. Once the specific faculty profile confirms the dismissal of the student profile through the selected computing device, the remote server receives the student profile dismissal confirmation from the selected computing device of the specific faculty profile.

Simultaneously, the remote server also wirelessly transmits boarding assist data of the updated instruction to the selected computing device of the authorized profile in order to receive a student profile pickup confirmation. The boarding assist data displays a schedule and list of students assigned to the authorized profile, dismissal locations, and dismissal timings. As well, the boarding assist data displays any student profiles that have been removed from the list of students assigned to the authorized profile for that particular day and assigned to be dismissed via alternative means (go home in a carpool, a school bus, enrolled in an after-school activity, etc.). Once the authorized profile confirms the pickup of the student profile through the selected computing device, the remote server receives the student profile pickup confirmation from the selected computing device of the authorized profile. As a result, the present invention is able to complete the dismissal process of the student profile. Optionally, the authorized profile may also have to input an electronic signature and an electronic timestamp confirming the dismissal process of the student profile.

When the authorized profile is the parent-driver profile, the boarding assist data is sent to the parent-driver. However, when the authorized profile is the bus-driver profile, the student-driver profile, the guest-driver profile, and the faculty-driver profile, route data of the updated instruction is wirelessly sent to the selected computing device of the specific parent profile. As a result, the specific parent profile is able to be aware of drop off locations, route information, any scheduled stops, etc.

Figure 10:
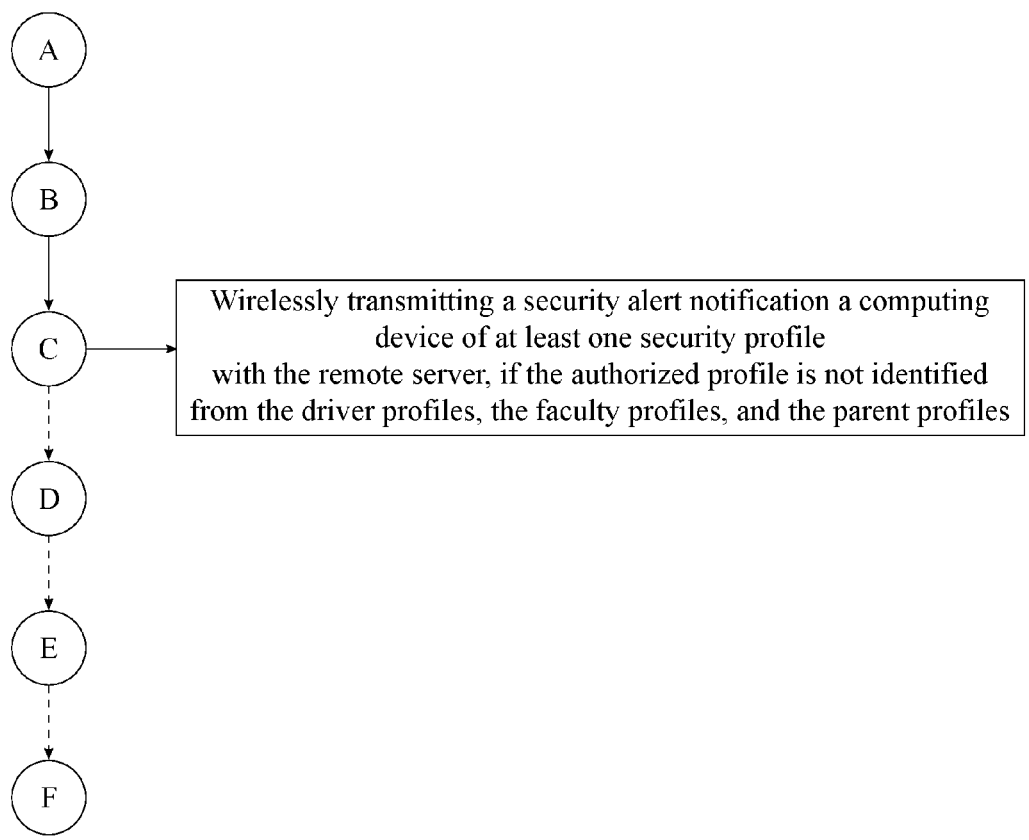
FIG. 10 is a basic flow chart illustrating the method of notifying security forces within the overall process of the present invention.

In reference to FIG. 2 and FIG. 10, if the authorized profile is not identified from the driver profiles, the faculty profiles, and the parent profiles during the process of scanning the incoming vehicle with the AI device, the remote server determines that the respective driver is not authorized to enter the school facility. The remote sever then wirelessly transmits a security alert notification to a computing device of at least one security profile so that the school security members can implement necessary precautions.

In alternative embodiments, the present invention may incorporate the use of global positioning system (GPS) software. This allows GPS-based self-check-in for improvements to dismissal and security processes. These changes and additions may occur as long as the scope and objective of the present invention remains unchanged.

Although the invention has been explained in relation to its preferred embodiment, it is to be understood that many other possible modifications and variations can be made without departing from the spirit and scope of the invention as hereinafter claimed.

What is claimed is:
1. A method of managing student arrival and student dismissal comprises the steps of:
 (A) providing at least one automobile identifying (AI) device and a remote server, wherein the remote server is communicably coupled with the AI device, and wherein the AI device is located at a school facility entrance;
 (B) providing a plurality of student supervision features, a plurality of driver profiles, a plurality of faculty profiles, and a plurality of parent profiles, wherein the student supervision features, the driver profiles, the faculty profiles, and the parent profiles are stored within the remote server;
 (C) scanning an incoming vehicle with the AI device to identify at least one authorized profile from the driver profiles with the remote server;
 (D) identifying at least one student profile for the authorized profile with the remote server, wherein the student profile is assigned to the authorized profile;
 (E) identifying at least one student management instruction and at least one additional instruction for the student profile to generate an updated instruction with the remote server, wherein the student management instruction and the additional instruction are assigned to the student profile;
 (F) wirelessly sending the updated instruction to at least one selected computing device with the remote server; validating the authorized profile in order to send the updated instruction of the student profile;

identifying a specific faculty profile from the faculty profiles and a specific parent profile from the parent profile for the student profile;
wirelessly transmitting student dismissal data of the updated instruction to the selected computing device of the specific faculty profile in order to receive a student profile dismissal confirmation; and
wirelessly transmitting boarding assist data of the updated instruction to the selected computing device of the authorized profile in order to receive a student profile pickup confirmation.

2. The method of managing student arrival and student dismissal as claimed in claim 1, wherein each of the driver profiles is a parent-driver profile.

3. The method of managing student arrival and student dismissal as claimed in claim 1, wherein each of the driver profiles is a bus-driver profile.

4. The method of managing student arrival and student dismissal as claimed in claim 1, wherein each of the driver profiles is a student-driver profile.

5. The method of managing student arrival and student dismissal as claimed in claim 1, wherein each of the driver profiles is a guest-driver profile.

6. The method of managing student arrival and student dismissal as claimed in claim 1, wherein each of the driver profiles is a faculty-driver profile.

7. The method of managing student arrival and student dismissal as claimed in claim 1 comprises the steps of:
scanning a vehicle identification of the incoming vehicle with the AI device;
capturing a driver image of the incoming vehicle with the AI device;
wirelessly transmitting the vehicle identification and the driver image from the AI device to the remote server; and
searching through the driver profiles to identify the authorized profile assigned to the vehicle identification, wherein the driver image matches to a profile image of the authorized profile.

8. The method of managing student arrival and student dismissal as claimed in claim 7, wherein the vehicle identification is a toll tag or a license plate.

9. The method of managing student arrival and student dismissal as claimed in claim 1 comprises the steps of:
identifying the student management instruction from an automation dismissal feature of the student supervision features with the remote server;
identifying the additional instruction from a dismissal management feature, an after-school activity management feature, and a carpool feature of the student supervision features with the remote server; and
merging the additional instruction from the dismissal management feature, the after-school activity management feature, and the carpool feature to the automation dismissal feature of the student supervision features to generate the updated instruction with the remote server.

10. The method of managing student arrival and student dismissal as claimed in claim 9 comprises the steps of:
providing a specific parent profile from the parent profiles, wherein the specific parent profile is associated with the student profile;
sending the additional instruction from a computing device of the specific parent profile to remote server;
storing the additional instruction to the dismissal management feature, the after-school activity management feature, or the carpool feature of the student supervision features with the remote server; and
sending to an updated notification to a computing device of a specific faculty profile and the authorized profile with the remote server, wherein the specific faculty profile is associated with the student profile.

11. The method of managing student arrival and student dismissal as claimed in claim 9 comprises the steps of:
providing a specific faculty profile from the faculty profiles, wherein the specific faculty profile is associated with the student profile;
sending the additional instruction from a computing device of the specific faculty profile to remote server;
storing the additional instruction to the dismissal management feature, the after-school activity management feature, or the carpool feature of the student supervision features with the remote server; and
sending to an updated notification to a computing device of a specific parent profile and the authorized profile with the remote server, wherein the specific parent profile is associated with the student profile.

12. The method of managing student arrival and student dismissal as claimed in claim 9, wherein the updated instruction includes student dismissal data, boarding assist data, route data, and student arrival data.

13. The method of managing student arrival and student dismissal as claimed in claim 1, wherein the authorized profile is a parent-driver profile.

14. The method of managing student arrival and student dismissal as claimed in claim 1 comprises the steps of:
wherein the authorized profile is a bus-driver profile; and
wirelessly transmitting route data of the updated instruction to the selected computing device of the specific parent profile.

15. The method of managing student dismissal as claimed in claim 1 comprises the steps of:
wherein the authorized profile is a student-driver profile; and
wirelessly transmitting route data of the updated instruction to the selected computing device of the specific parent profile.

16. The method of managing student arrival and student dismissal as claimed in claim 1 comprises the steps of:
wherein the authorized profile is a guest-driver profile; and
wirelessly transmitting route data of the updated instruction to the selected computing device of the specific parent profile.

17. The method of managing student arrival and student dismissal as claimed in claim 1 comprises the steps of:
wherein the authorized profile is a faculty-driver profile; and
wirelessly transmitting route data of the updated instruction to the selected computing device of the specific parent profile.

18. The method of managing student arrival and student dismissal as claimed in claim 1 comprises the steps of:
validating the authorized profile in order to send the updated instruction of the student profile;
identifying a specific faculty profile from the faculty profiles and a specific parent profile from the parent profile for the student profile; and
wirelessly transmitting student arrival data of the updated instruction to the selected computing device of the specific faculty profile in order to receive a student profile arrival confirmation.

19. The method of managing student arrival and student dismissal as claimed in claim 1 comprises the steps of:

wirelessly transmitting a security alert notification to a computing device of at least one security profile with the remote server,
if the authorized profile is not identified from the driver profiles, the faculty profiles, and the parent profiles during step (C).

* * * * *